Figure 1:
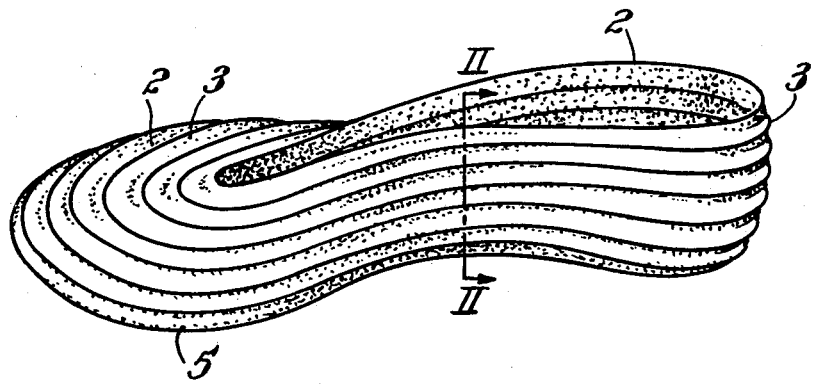

July 13, 1965  M. A. ROBERTS  3,193,948
FOOTWEAR

Filed April 22, 1963   2 Sheets-Sheet 1

Inventor
Mary Appelby Roberts
By Stevens Davis, Miller & Mosher
Attorneys

July 13, 1965   M. A. ROBERTS   3,193,948
FOOTWEAR
Filed April 22, 1963   2 Sheets-Sheet 2
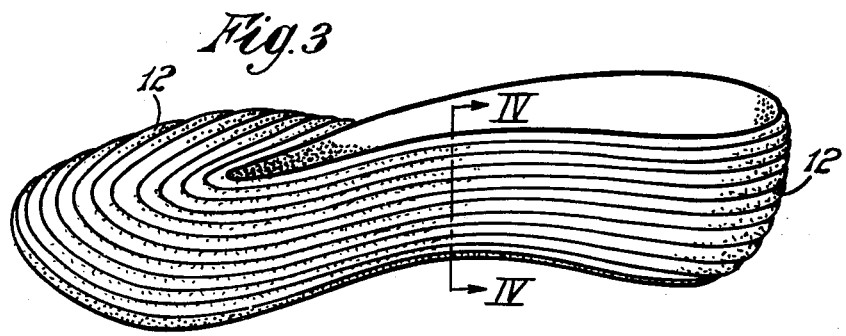
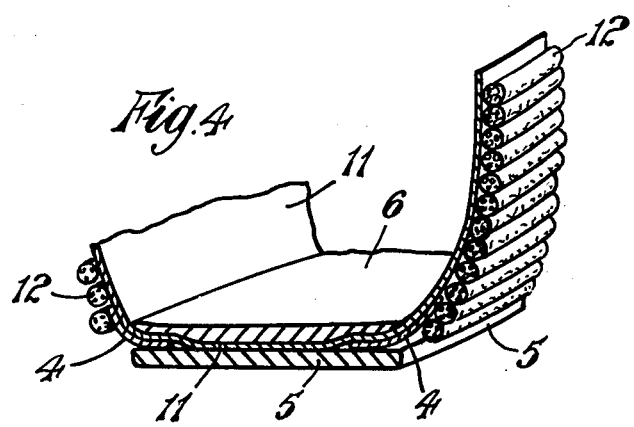
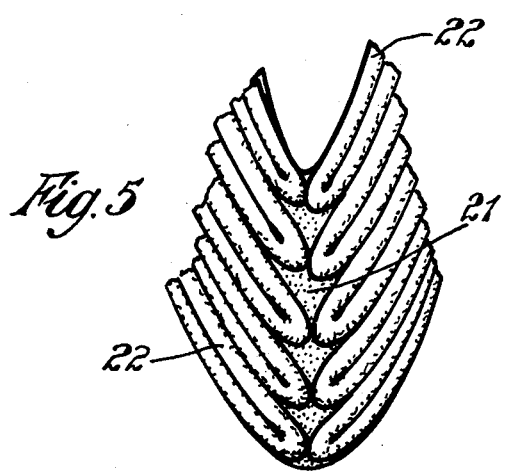
Inventor
Mary Appelby Roberts
By Stevens, Davis, Miller & Mosher
Attorneys United States Patent Office 3,193,948
Patented July 13, 1965

3,193,948
FOOTWEAR
Mary Appleby Roberts, Kings Heath, Birmingham, England, assignor to Dunlop Rubber Company Limited, London, England, a British company
Filed Apr. 22, 1963, Ser. No. 274,572
Claims priority, application Great Britain, May 9, 1962, 17,761/62
2 Claims. (Cl. 36—2.5)

This invention relates to footwear.

The manufacture of footwear involves the cutting and joining of shaped components such as vamps and quarters to form an upper and the lasting and closing of the upper so formed with consequent wastage of scrap material and the necessity of considerable labor and expense in carrying out the steps of the process.

An object of the invention is to provide footwear with an upper of conventional material such as fabric, leather or plastics by a simplified process.

According to the invention footwear has an upper comprising strips of material secured adjacent to one another.

The invention includes a method of making footwear which comprises forming an upper by applying strips of material over a shaped core and securing them adjacent to one another, and affixing a sole and a heel to the upper.

The strips of material may be textile cord, yarn, tape, braid, ribbon or lace; leather; extrusions or cut sheet rubber or flexible plastics; or coated paper.

The strips of material may be applied to the shaped core over and secured to a fabric underlayer, for instance a knitted sock and sock stiffeners, toe-puffs and the like components may be provided beneath the strips.

Usually the strips are applied by traversing a length of material laterally and/or longitudinally over the shaped core, adjacent traverses providing the strips which may overlap or abut each other or be spaced apart over the underlayer. Spaces between adjacent strips, which may be required in order that the remainder of the core is conveniently covered during the traversing, may be filled with further strips. In the case where overlapping strips, for example of tape, are employed it is usually possible to form the upper by traversing and varying the amount of overlap so that the strips extend so as to conform to the shaped core.

If required, surplus strips or parts of strips may be trimmed, for example to provide the aperture in the upper to allow entry of the foot of the user and the removal of the shaped core.

The strips may be secured to one another and/or to the underlayer by adhesive which may be applied to the length of material immediately before its application over the core. In the case where an underlayer is used between the core and the strips, the adhesive may be applied to the underlayer and/or to the strips. Alternatively the strips, and if required also the underlayer, may be of thermoplastic material such as polyvinyl chloride, or coated with such material, and the strips may be secured to one another and/or to the underlayer by heating, for instance high frequency electric welding.

The length of material may be carried in a roll adjacent to a shaped core provided with traversing means for traversing and inclining the core so as to take up the material and apply it in strips over its surface.

After the application of the strips the upper is finished as required, for example by binding its edge, and a sole and a heel are affixed.

Figure 2:
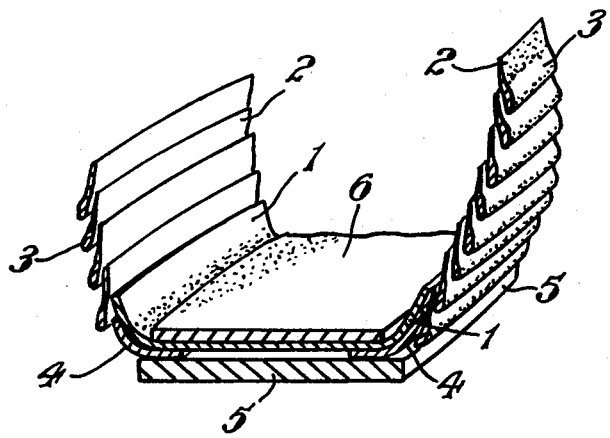

The invention will be described by way of example with reference to the accompanying drawings in which like components are indicated by like reference numerals and wherein:

FIGURE 1 shows a shoe having an upper formed predominantly of adjacent overlapping strips of braid, FIGURE 2 shows the shoe of FIGURE 1 cut along the line II—II, FIGURE 3 shows a slipper having an upper formed predominantly of adjacent strips of woolen yarn wound onto a stockinette underlayer, FIGURE 4 shows the slipper of FIGURE 3 cut along the line IV—IV and FIGURE 5 shows the toe portion of a slipper having an alternative wool winding to that shown in FIGURE 3.

In producing the shoe shown in FIGURE 1 stockinette 1 was drawn and secured over the sole and heel portion of a shaped core and a length of braided tape 2 was coated on one side with a latex adhesive and wound helically over the core, starting at the feather portion of the core and finishing at the top line of the shoe. The braided tape 2 had a rib 3 of braid along one edge and was overlapped sufficiently to provide a continuously covered upper, the adjacent strips of material being overlapped to a greater extent at the back, where the height of the upper was least, than at the toe portion.

The feather portion of the core was provided with a reinforcement piece of rubber 4, extending over the stockinette underlayer 1 and beneath the adjacent strip of braided tape 2 and a rubber sole and heel portion 5 was affixed over the underlayer and the reinforcement piece 4. The reinforcement piece and the combined sole and heel were affixed with a latex adhesive and, after removal of the core, a cellular rubber insole 6 was similarly affixed over the stockinette underlayer.

The slipper shown in FIGURE 3 was made in a similar manner to that described above except that a stockinette underlayer 11 was drawn over the whole of the shaped core and a thick 6-ply wool yarn 12 was employed in lieu of the braided tape and was not overlapped. In this example, the required design of the slipper permitted the strips of wool formed by the winding to be uniformly abutted.

After winding the wool was brushed up and the slipper produced had an attractive fleecy appearance and feel.

In another example, shown in FIGURE 5, the procedure of the previous example was repeated employing a shaped core with a narrow pointed toe. As in the previous example, a stocking underlayer, shown as 21, was drawn over the whole of the shaped core, and a strip of woolen yarn 22 wound thereover. Instead of winding the strip of woolen yarn helically it was applied up to the pointed toe and then bent back, and extended round the core to the toe where it was again turned back and traversed over the core, the procedure being repeated until strips were applied up to the top line of the slipper.

Having now described my invention, what I claim is:

1. Footwear comprising a fabric underlayer shaped according to the shape of a foot and defining a toe portion, a heel portion, a bottom portion, an upper portion adjoining said bottom portion, and a cavity to permit entry of a foot therein; an inner sole affixed to the inner surface of said underlayer over said bottom portion; a reinforcement piece extending around the outer surface of said underlayer and overlying a part of said bottom portion and a part of said upper portion of the underlayer; an outsole and heel affixed to the outer surface of said underlayer over said bottom portion and over part of said reinforcement piece; and a continuous strip of thick textile yarn laid upon the outer surface of said upper portion and overlying part of said reinforcement piece and generally helically wound about said upper portion with adjacent transversing portions being individually adhesively secured to said upper portion in an abutting relationship, and successively traversing said upper portion from one side of said toe portion, around said heel portion, to the other side of said toe portion, where it is bent back to extend around said heel portion in the opposite sense.

2. Footwear comprising a fabric underlayer shaped according to the shape of a foot and defining a toe portion, a heel portion, a bottom portion, an upper portion adjoining said bottom portion, and a cavity to permit entry of a foot therein; an inner sole affixed to the inner surface of said underlayer over said bottom portion; a reinforcement piece extending around the outer surface of said underlayer and overlying a part of said bottom portion and a part of said upper portion of the underlayer; an outsole and heel affixed to the outer surface of said underlayer over said bottom portion and over part of said reinforcement piece; and a continuous strip of thick textile yarn laid upon the outer surface of said upper portion and overlying part of said reinforcement piece and generally helically wound about said upper portion with adjacent transversing portions being individually adhesively secured to said upper portion in an abutting relationship, and successively traversing said upper portion from said toe portion around said heel portion and back to said toe portion where it continues in the same sense to the heel portion again.

References Cited by the Examiner

UNITED STATES PATENTS

| | | | |
|---|---|---|---|
| 334,561 | 1/86 | Buchanan | 36—9 X |
| 334,562 | 1/86 | Buchanan | 36—9 |
| 575,424 | 4/04 | Vohl | 36—3 |
| 2,147,197 | 2/39 | Glidden | 36—45 X |
| 2,581,728 | 1/52 | Spack | 36—9 |
| 2,586,045 | 2/52 | Hoza | 36—9 |
| 3,015,170 | 1/62 | Kramer | 36—9 |
| 3,044,189 | 7/62 | Noda | 36—14 |

FOREIGN PATENTS 337,012   5/21   Germany.

JORDAN FRANKLIN, *Primary Examiner*.